(12) United States Patent
Forsythe et al.

(10) Patent No.: US 6,175,290 B1
(45) Date of Patent: Jan. 16, 2001

(54) CONTACTLESS STALK MOUNTED CONTROL SWITCH

(75) Inventors: Alan K. Forsythe, Federal Way; Andrew F. Thompson, Auburn; Charles H. Simmons, Seattle; John M. Morris, Auburn, all of WA (US)

(73) Assignee: GT Development Corporation, Seattle, WA (US)

( * ) Notice: Under 35 U.S.C. 154(b), the term of this patent shall be extended for 0 days.

(21) Appl. No.: 09/343,922

(22) Filed: Jun. 30, 1999

(51) Int. Cl.[7] ..................................................... H01H 9/00
(52) U.S. Cl. .......................................... 335/207; 335/205
(58) Field of Search ...................................... 335/205–207

(56) References Cited

U.S. PATENT DOCUMENTS

| | | | |
|---|---|---|---|
| 3,818,393 | * 6/1974 | Morgott | 335/205 |
| 4,061,988 | * 12/1977 | Lewandowski | 338/32 H |
| 4,137,512 | 1/1979 | Sidor . | |
| 4,187,483 | 2/1980 | Whitney . | |
| 4,357,507 | * 11/1982 | Labaune et al. | 200/61.27 |
| 4,458,226 | * 7/1984 | Cho | 335/205 |
| 4,489,303 | * 12/1984 | Martin | 338/128 |
| 4,640,997 | 2/1987 | Lane, Jr. . | |
| 4,900,946 | 2/1990 | Williams et al. . | |
| 5,283,403 | 2/1994 | Machalitzky et al. . | |
| 5,430,265 | 7/1995 | Beattie et al. . | |
| 5,607,049 | 3/1997 | Shioda . | |
| 5,646,587 | * 7/1997 | Miyazawa et al. | 335/205 |
| 5,954,616 | 9/1999 | Snell et al. . | |

* cited by examiner

*Primary Examiner*—Lincoln Donovan
(74) *Attorney, Agent, or Firm*—Christensen O'Connor Johnson Kindness PLLC

(57) ABSTRACT

A contactless control switch (20) for a vehicle for actuating a system between an open and a first closed circuit position is disclosed. The switch includes a housing (22) and a pivot assembly (24) disposed within the housing. The switch also includes a switch actuator (26) having first and second ends. The switch actuator is coupled to the pivot assembly for producing pivoting motion of the switch actuator in response to a force (84) applied to the switch actuator. The switch also includes first and second proximity sensors (80a and 80b) and a first magnet (70). The proximity sensors are disposed within the housing and the first magnet is fastened to the switch actuator second end. The first magnet is adapted to be selectively displaced into and out of close proximity with one of the proximity sensors when the force is applied to the switch actuator. The switch (20) also includes a biasing member (52a and 52b) disposed between the switch actuator and the pivot assembly for biasing the switch actuator into an open circuit position.

18 Claims, 3 Drawing Sheets

CONTACTLESS STALK MOUNTED CONTROL SWITCH

FIELD OF THE INVENTION

The present invention relates generally to steering column stalk mounted control switches and, more particularly, to contactless steering column mounted control switches for heavy duty vehicles.

BACKGROUND OF THE INVENTION

The operator's compartment of most vehicles, such as Class 8 trucks, generally include control switches that are in communication with a variety of electrical systems. In a current typical system, actuation of the switch produces a relatively high current which is capable of breaking through the resistance of corrosion, oxidation, and contaminants that may have formed on the contacts. However, modern electronic applications, such as computers, do not require high current. Computers generally employ very low current output to activate the switching action of a larger driver circuit. Such driver circuits are used to actuate a variety of systems, such as turn signals or cruise control of the vehicle. Low current switches are much more susceptible to environmental contamination.

Switches currently available for such systems are typically exposed contact switches. Contact switches generally include a lever and attached, plated or unplated, copper contacts that may be directly actuated into and out of physical contact with corresponding contacts of the driver circuit. In a typical arrangement, the lever extends from within a housing disposed within the steering column control stalk of the vehicle. Displacement of the lever causes the lever contact to be displaced into contact with the driver circuit contact located within the housing. Contact between the lever contact and the driver circuit contact results in a closed circuit, thereby actuating the turn signal or some other feature of the vehicle. Although such switches are effective at changing the state of a switch, they are not without their problems.

First, because physical contact between the lever contact and circuit contact is required to close the circuit, and the contacts are exposed to the environment, such switches often suffer high rates of failure. Additionally, reliability is also compromised due to frictional contact and wear on pivoting and detenting features. Debris or corrosion may build up at the contact points between the lever contact and the circuit contact, thereby causing an unintended and undesirable increase in impedance of the switch. Such corrosion also decreases the useful life of the switch. Finally, such switches are relatively expensive to manufacture due to the complexity of the contact arrangements and the need to switch relatively high current.

Thus, there exists a need for a contactless switch that is economical to manufacture, has a high degree of reliability and meets the performance expectations of the end user.

SUMMARY OF THE INVENTION

In accordance with the present invention, a contactless control switch for a vehicle is provided. The contactless switch includes a housing and a pivot assembly disposed within the housing. The contactless switch also includes a switch actuator having first and second ends. The switch actuator is coupled to the pivot assembly for pivoting motion of the switch actuator in response to a force applied to the switch actuator. A contactless switch formed in accordance with the present invention also includes first and second proximity sensors and a first magnet. The proximity sensors are disposed within the housing and the first magnet is fastened to the switch actuator second end. The first magnet may be selectively displaced into and out of close proximity with one of the proximity sensors when the force is applied to the switch actuator.

In accordance with further aspects of this invention, the pivot assembly includes first and second portions. The first portion is supported by the housing for transfer of loads from the switch actuator to the housing, and the second portion is fastened to the switch actuator. The second portion includes a first pivot point about which the switch actuator and second portion pivot to selectively displace the first magnet into close proximity with a predetermined number of the proximity sensors.

In accordance with other aspects of this invention, the second portion further includes a second pivot point about which the switch actuator and second portion pivot to selectively displace the first magnet into close proximity with a predetermined number of the proximity sensors.

In accordance with still other aspects of this invention, the switch actuator pivots about the first and second pivot points along a stroke path, such that the first magnet is selectively reciprocated between the plurality of proximity sensors along a predetermined path.

In accordance with still yet other aspects of this invention, the plurality of proximity sensors are disposed within the housing, and the proximity sensors are reed switches, such that the plurality of proximity sensors are positioned at predetermined angles relative to the path to assure activation of the selected reed switch due to motion of the switch actuator, and assure de-activation of the selected reed switch when the switch actuator is released, thereby minimizing the stroke of the switch actuator. In one embodiment of the present invention, the predetermined angles are oblique angles.

A contactless control switch for a vehicle formed in accordance with the present invention has several advantages over currently available control switches. A switch formed in accordance with the present invention has a longer useful life than contact switches currently available because there is no physical contact between switch actuator components and electrical circuit components. Additionally, because the proximity sensors are positioned within the switch at predetermined angles relative to the path of the switch actuator, such an arrangement minimizes the stroke of the switch actuator, thereby reducing the size of the switch. Further, because the first portion of the pivot assembly is supported by both the switch housing and mounting bracket, loads from the switch actuator are distributed directly to the mounting bracket. Finally, because the second portion of the pivot assembly is disposed within the housing such that it is positioned between the first portion of the switch assembly and the plurality of proximity sensors, such a switch results in a motion anticipated by the end user. Thus, a contactless control switch for a vehicle formed in accordance with the present invention is economical to produce, has a high switching action reliability and produces the customary and anticipated response while changing state of the switch.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
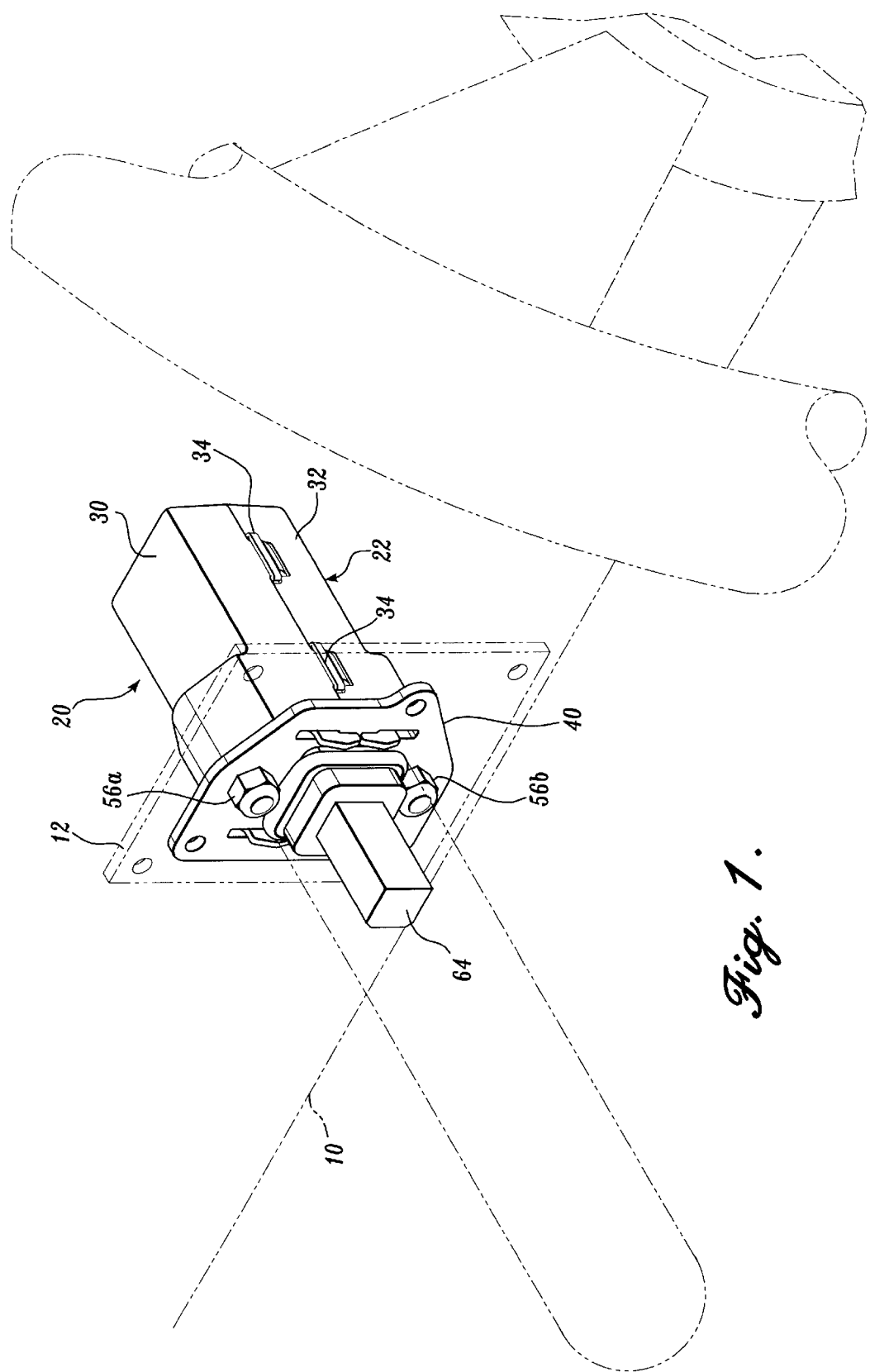
FIG. 1 is an environmental view of a contactless control switch formed in accordance present invention as it would be fastened to a steering column stalk of a vehicle.
Figure 2:
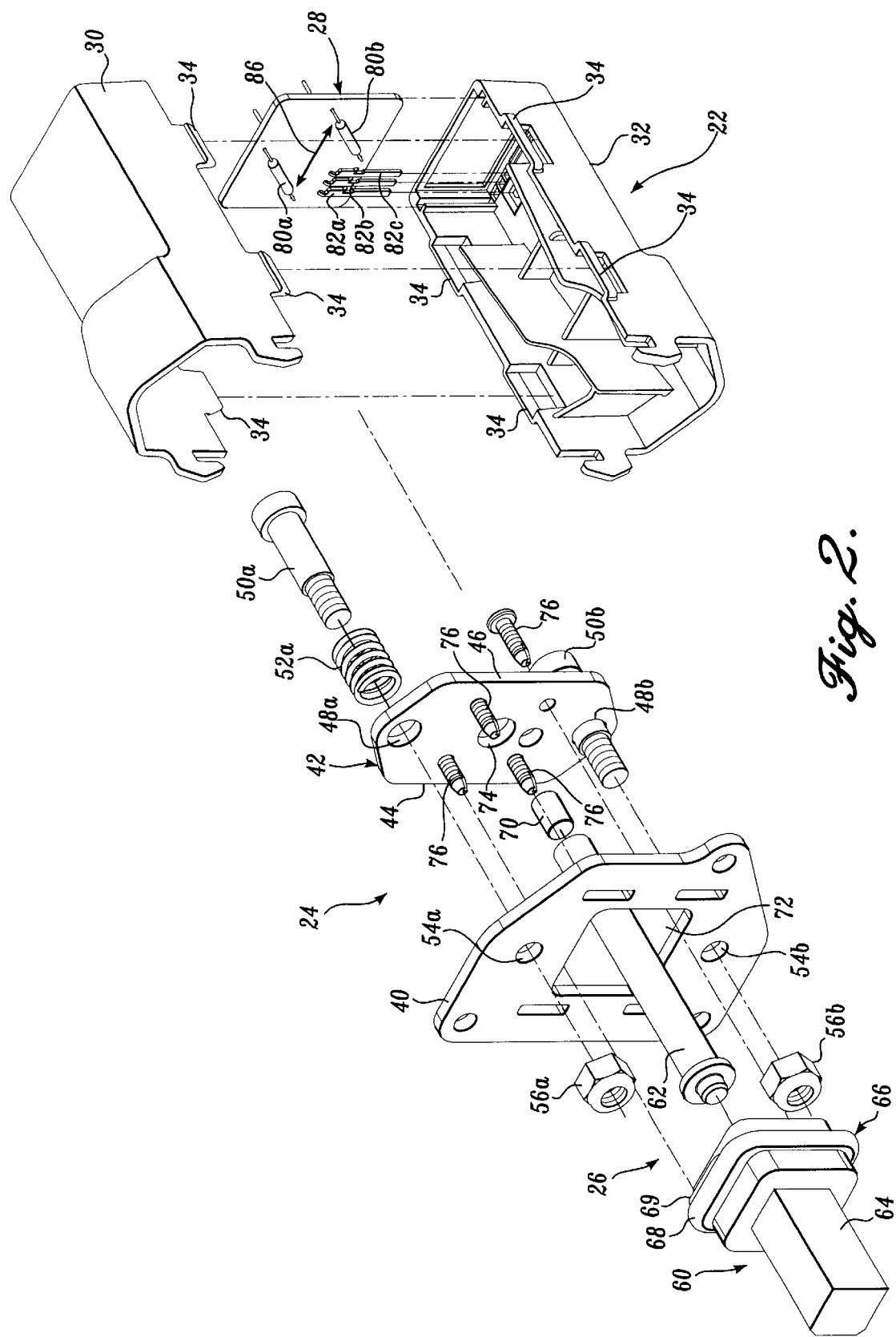
FIG. 2 is an exploded view of a contactless control switch formed in accordance with the present invention showing the major elements of the switch.

FIGS. 1 and 2 illustrate a preferred embodiment of a contactless control switch 20 constructed in accordance with the present invention. The term, "contactless switch" in this invention refers to an arrangement where there is no physical connection between the actuating lever which is moved by the operator, and the electrical circuit components themselves. The motive means to cause the circuit to close or open is a non-physical means, such as a magnetic field, a light beam, or other "contactless" motive means.

As seen in FIG. 1, the switch 20 is sized and adapted to be received within a steering column stalk 10 of a vehicle, such as a Class 8 truck. The switch 20 is mounted to the steering column stalk 10 by a well known bracket 12 and fasteners, such as bolts. Preferably, such switches 20 are used within the vehicle to actuate a variety of systems. As a nonlimiting example, a switch 20 constructed in accordance with the present invention may be used to actuate a driver circuit adapted to selectively change gears of a transmission. In this regard, the switch 20 sends a resistance value signal to a central processing unit (CPU) located elsewhere in the vehicle. The CPU then signals the transmission to change gears. While the foregoing example was described as actuating the transmission of a vehicle, a switch 20 formed in accordance with the present invention is not intended to be so limited. As such, the switch 20 may be used to actuate a large variety of features of the vehicle, such as cruise control, turn signals, running lights and wiper systems.

As may be seen best by referring to FIG. 2, the contactless control switch 20 includes a switch housing 22, a pivot assembly 24, a switch actuator 26 and a printed circuit board 28. The switch housing 22 includes upper and lower casings 30 and 32. The casings 30 and 32 may be injection-molded from a thermoplastic and are suitably fastened together by well known fasteners 34, such as snap fasteners. The casings 30 and 32 are similarly configured and are sized to house the printed circuit board 28, the pivot assembly 24 and at least a portion of the switch actuator 26.

The pivot assembly 24 includes a support plate 40 and a rocker plate 42. Both the support plate and rocker plate 40 and 42 are suitably formed from a metal, such as steel. The rocker plate 42 is substantially rectangular in configuration and the longitudinally extending edges define first and second pivot axes 44 and 46, about which the switch actuator 26 pivots, as is described in greater detail below.

Located at opposite ends of the rocker plate 42 are first and second vertically extending support plate attachment bores 48a and 48b. The rocker plate 42 is pivotably fastened to the side of the support plate 40 received within the switch housing cavity by first and second shoulder bolts 50a and 50b. Disposed between the lower surface of the rocker plate 42 and each shoulder bolt 50a and 50b is a coil spring 52a and 52b. The coil springs 52a and 52b are disposed between the rocker plate 42 and each shoulder bolt 50a and 50b to bias the rocker plate 42 into an open circuit position, wherein the rocker plate 42 and the support plate 40 are substantially parallel, as is described in greater detail below.

The shoulder bolts 50a and 50b extend through the support plate attachment bores 40a and 40b of the rocker plate 42 and through corresponding vertically extending bores 54a and 54b located in the support plate 40. Each shoulder bolt 50a and 50b is threadably secured thereto by well known internally threaded nuts 56a and 56b. The diameter of each support plate attachment bore 48a and 48b is slightly larger than the diameter of the shoulder bolt 54a and 54b by a predetermined amount to permit pivoting of the rocker plate 42, as is described in greater detail below. The support plate attachment bores 48a and 48b are tapered to reduce slope in the nominal or open circuit position while still allowing the full range of motion.

Still referring to FIG. 2, the switch actuator 26 will now be described in greater detail. The switch actuator 26 includes an arm 60 and a cylindrical shaft 62. The arm 60 includes a handle portion 64 and a base portion 66. For ease of illustration, the handle portion 64 is illustrated as a rectangular rod. However, it is to be noted that the handle portion 64 may be adapted for a variety of purposes, including turn signal and transmission actuation. As a result, the handle portion 64 may include wiring (not shown) extending therethrough.

The base portion 66 is substantially rectangular in shape and includes a stop collar 68 extending around the perimeter of the base portion 66. Opposite sides of the stop collar 68 include integrally formed flanges 69 extending from the side of the stop collar 68 adjacent the support plate 40 when the switch 20 is assembled. For ease of illustration, only one flange 69 is visible in FIG. 2. However, it should be noted that a second flange identical to the first flange 69 is similarly formed on the opposite side of the stop collar 68, such that the flanges are parallel to each other. The lower edges of each flange are sized to fit flush against the support plate 40 when the switch actuator is actuated, to limit rotation of the switch actuator 26 and transfer loads from the switch actuator 26 to the support plate 40 and to the bracket 12, as is described in greater detail below.

The shaft 62 is sized to be centrally received within the base portion 66 and may be suitably fastened thereto by well known fasteners, such as snap fittings or glue, or may be held in place by the attachment of the pivot plate 42. Alternatively, the shaft 62 may be integrally formed with the base 66. The other end of the shaft 62 is sized to receive a magnet 70 therein. As assembled, the switch actuator 26 is received and fastened within a rectangularly shaped opening 72 centrally located in the support plate 40. A gap is formed between the inner sides of the stop collar 68 and the support plate 40. The gap permits the switch actuator 26 to pivot in a direction defined by an axis, as is described in greater detail below.

The shaft 62 extends through a vertically extending bore 74 centrally located in the rocker plate 42, such that the end of the shaft 62 that includes the magnet 70 depends downwardly within the switch housing 22. The rocker plate 42 is fastened to the underside of the switch actuator base portion 66 by a plurality of well known fasteners 76, such as screws, and held in releasable contact with the pivot plate 40 by springs 52a and 52b.

The printed circuit board 28 (PCB) includes a pair of proximity sensors 80a and 80b and a plurality of well known elongate probe connectors 82a–82c. For ease of illustration and clarity, only the major components of the PCB 28 have been illustrated. The probe connectors 82a and 82b extend outwardly from the switch housing 22 through corresponding bores extending through the switch housing 22. The probe connectors 82a and 82b are operatively connected to an electrical system (not shown) located elsewhere within the vehicle. Thus, as attached, the electrical system is placed into communication with the PCB 28 by the probe connectors 82a and 82b. The well known proximity sensors 80a and 80b are preferably reed switches. Although reed switches are preferred, other well known proximity sensors, such as Hall effect sensors, are also within the scope of the present invention. The PCB 28 is suitably fastened within the switch housing 22 by being slid into a slot and then held in place by the housing assembly.

Figure 3:
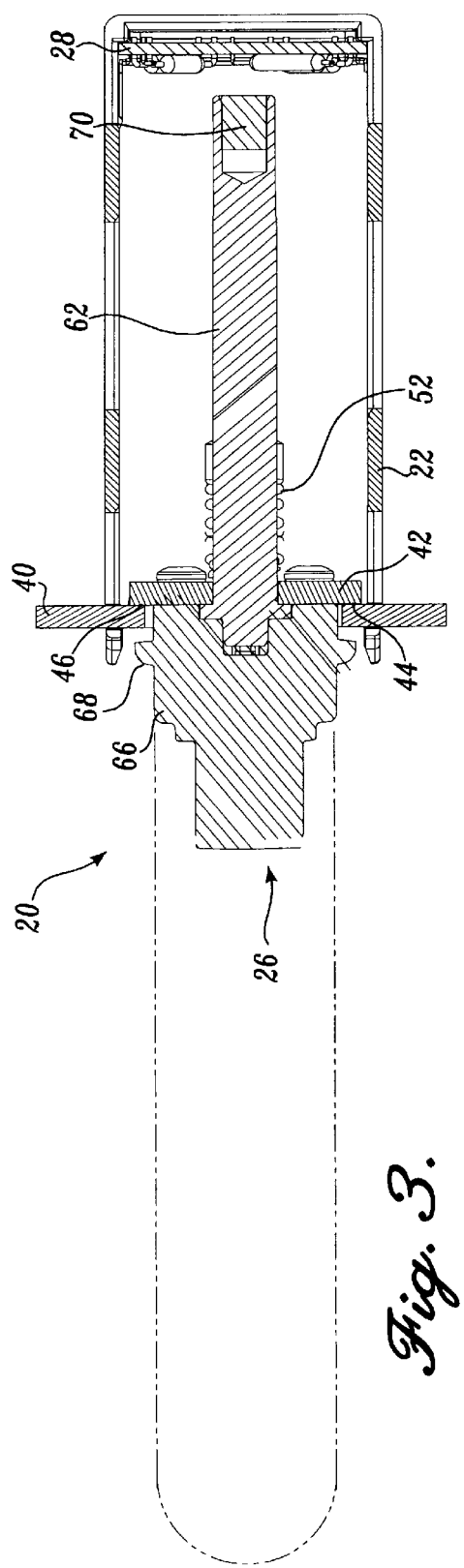
FIG. 3 is a longitudinal cross sectional view of a contactless control switch formed in accordance with the present invention shown in an open circuit position.
Figure 4:
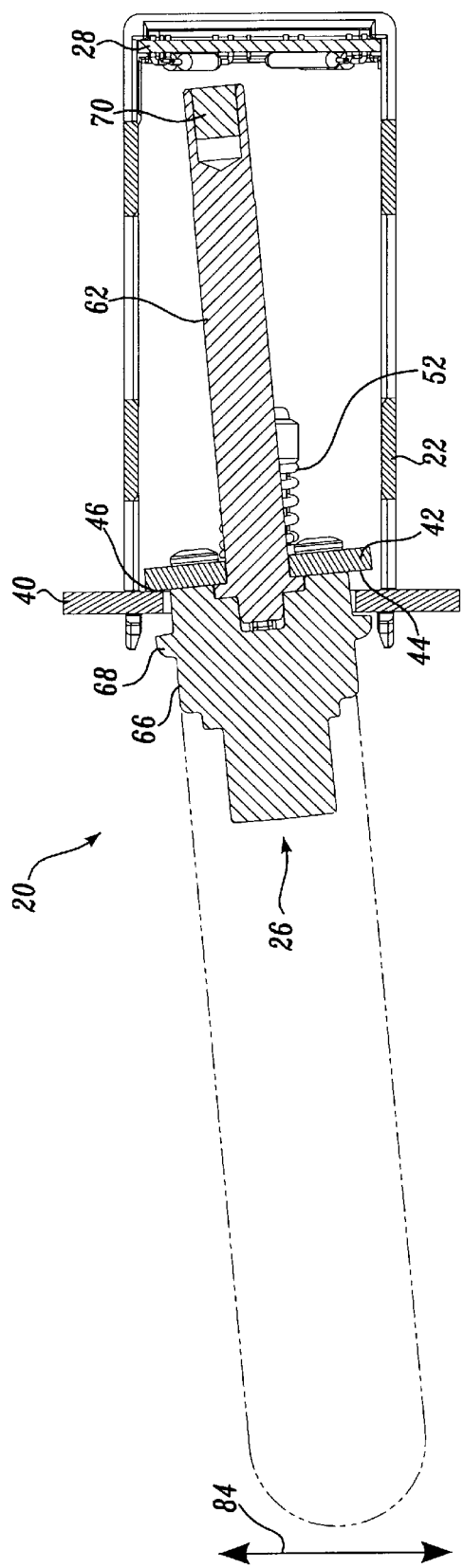
FIG. 4 is a longitudinal cross sectional view of a contactless control switch formed in accordance with the present invention shown in a closed circuit position.

Operation of the control switch 20 of the present invention may be best understood by referring to FIGS. 3 and 4. The switch 20 has at least three distinct positions; an open circuit position and first and second closed circuit positions.

The open circuit position may be best understood by referring to FIG. 3. In FIG. 3, the shaft 62 of the switch actuator 26 is disposed substantially normal to the PCB 28, such that the magnet 70 is positioned equidistant from both of the proximity sensors 80a and 80b. In this open circuit position, the rocker plate 42 is substantially parallel to and in contact with the inwardly facing surface of the support plate 40. As noted above, there is a gap between the stop collar 68 and the outwardly facing surface of the support plate 40. As a result, a load applied to the switch actuator handle portion 64 in a direction perpendicular to and away from pivot axis 44 will first cause the switch actuator 26 to pivot around pivot axis 44 until stop collar 68 and flanges 69 come in contact with the outwardly facing surface of support plate 40, at which point the applied load is transferred to the support plate 40 and, therefore, to the bracket 12. Further, the coil springs 52a and 52b bias the switch actuator 26 into the open circuit position. Similarly, a load applied to the switch actuator handle portion 64 in a direction perpendicular to and away from pivot axis 46 will first cause the switch actuator to pivot around pivot axis 46 until stop collar 68 and flanges 69 again come in contact with the outwardly facing surface of support plate 40. Again, the coil springs 52a and 52b bias the switch actuator 26 back into the open circuit position. The closed circuit positions may be best understood by referring to FIG. 4. As seen in FIG. 4, the switch actuator 26 is pivotal about the rocker plate first and second pivot axes 44 and 46 in a direction that is substantially normal to the elongate direction of the switch actuator 26. For clarity, the pivot direction of the switch actuator 26 is illustrated by the arrow 84. In the first closed circuit position of FIG. 4, an operator applies a load to the switch handle portion 64, thereby displacing the shaft 62 into close proximity with one of the two proximity sensors 80a and 80b. As may be best seen by referring back to FIG. 2, the proximity sensors 80a and 80b are positioned on the PCB 28 at a predetermined angle relative to the movement of the switch actuator 26 to minimize the stroke path of the switch actuator 26. As a non-limiting example, the proximity sensors 80a and 80b are disposed on the PCB 28 at substantially oblique angles relative to the switch actuator stroke path indicated by the arrow 86. Although the proximity switches 80a and 80b are preferably oriented on the PCB 28 at oblique angles, other angles, such as an acute angle, are also within the scope of the present invention.

Referring back to FIG. 4, in the first open circuit position, the switch actuator 26 pivots about the second pivot axis 46 and compresses both coil springs 52a and 52b. The switch is held in this closed circuit position for as long as the operator holds the switch actuator arm 60 in this position. Upon release of the arm 60, the springs 52a and 52b displace the switch actuator 26 back into its normally upright, open circuit position of FIG. 3.

As noted above, a switch 20 formed in accordance with the present invention may be displaced into a second closed circuit position, wherein the switch actuator 26 pivots about the first pivot axis 44, thereby displacing the magnet 70 towards the other of the proximity sensors 80a and 80b. This second closed circuit position is identical to the first closed circuit position with the exception that the switch actuator 26 is displaced in the opposite direction along the arrow 84. Thus, in the second closed circuit position, the switch actuator 26 pivots about the first pivot axis 44 to selectively displace the magnet 70 into close proximity with a different proximity sensor.

The previously described version of the present invention provides several advantages over currently available steering column stalk mounted control switches. First, a switch formed in accordance with the present invention has a longer useful life than switches currently available because there is no physical contact between switch actuator components and electrical circuit components, and there is a reduction in the wear that can be associated with pivot joints, bearings, and detent features. Additionally, because the proximity sensors are positioned within the switch at the predetermined angles relative to the path of the switch actuator, such an arrangement minimizes the stroke of the switch actuator, thereby reducing the size of the switch. Loads from the switch actuator are distributed to the support plate and then directly to the mounting bracket. Finally, because the rocker plate is disposed within the housing such that it is positioned between the support plate and the proximity sensors, such a switch results in a motion anticipated by the end user. Thus, a contactless control switch for a vehicle formed in accordance with the present invention is economical to produce, has high switching action reliability and produces the customary and anticipated response while changing the state of the switch.

From the foregoing description, it can be seen that a contactless switch formed in accordance with the present invention incorporates many novel features and offers significant advantages over currently available steering column stalk mounted control switches. While the presently preferred embodiments of the invention have been illustrated and described, it is to be understood that within the scope of the appended claims, various changes can be made therein without departing from the spirit of the invention.

The embodiments of the invention in which an exclusive property or privilege is claimed are defined as follows:

1. A contactless control switch for a vehicle, the contactless switch is actuatable between a first closed circuit position and an open circuit position, the contactless switch comprising:

(a) a housing;

(b) a pivot assembly disposed within the housing, wherein the pivot assembly includes a first and second portions;

(c) a switch actuator having first and second ends, the switch actuator being coupled to the pivot assembly for producing pivoting motion of the switch actuator in response to a force applied to the switch actuator; and (d) first and second proximity sensors and a first magnet, the proximity sensors being disposed within the housing and the first magnet being fastened to the switch actuator second end, the first magnet being selectively displaced into and out of close proximity with one of the proximity sensors when the force is applied to the switch actuator, wherein the second portion comprises a first pivot axis about which the switch actuator and second portion pivot to selectively displace the first magnet into close proximity with a predetermined number of the proximity sensors in response to the force.

2. The contactless control switch of claim 1, wherein the first portion is adapted to be supported by a mounting bracket for transfer of loads from the switch actuator to the mounting bracket, and the second portion is fastened to the switch actuator.

3. The contactless control switch of claim 1, wherein the second portion further comprises a second pivot axis about which the switch actuator and second portion pivot to selectively displace the first magnet into close proximity with a predetermined number of the proximity sensors in response to the force.

4. The contactless control switch of claim 3, wherein the switch actuator pivots about the first and second pivot points along a stroke path, such that the first magnet is selectively reciprocated between the plurality of proximity sensors along a predetermined path.

5. The contactless control switch of claim 4, wherein the plurality of proximity sensors are disposed within the housing, such that the plurality of proximity sensors are positioned at predetermined angles relative to the path to minimize the stroke of the switch actuator.

6. The contactless control switch of claim 5, wherein the predetermined angles are oblique angles.

7. The contactless control switch of claim 6, wherein the proximity sensors are reed switches.

8. The contactless control switch of claim 2, wherein the proximity sensors are reed switches.

9. The contactless control switch of claim 8, wherein the second portion of the pivot assembly is disposed within the housing such that it is positioned between the first portion of the switch assembly and the plurality of proximity sensors.

10. A contactless control switch for a vehicle, the contactless switch is actuatable between a first closed circuit position and an open circuit position, the contactless switch comprising:

(a) a housing;

(b) a pivot assembly disposed within the housing, the pivot assembly having a first portion supported by the housing and a second portion;

(c) a switch actuator having first and second ends, the switch actuator being supported within the housing on the pivot assembly first portion, the switch actuator being coupled to the pivot assembly second portion for producing pivoting motion of the switch actuator in response to a force applied to the switch actuator; and (d) first and second proximity sensors and a first magnet, the proximity sensors being disposed within the housing and the first magnet being fastened to the switch actuator second end, the first magnet being selectively displaced into and out of close proximity with one of the proximity sensors when the force is applied to the switch actuator, wherein the second portion comprises a first pivot axis about which the switch actuator and second portion pivot to selectively displace the first magnet into close proximity with a predetermined number of the proximity sensors in response to the force.

11. The contactless control switch of claim 10, wherein the second portion further comprises a second pivot axis about which the switch actuator and second portion pivot to selectively displace the first magnet into close proximity with a predetermined number of the proximity sensors in response to the force.

12. The contactless control switch of claim 11, wherein the switch actuator pivots about the first and second pivot axes along a stroke path, such that the first magnet is selectively reciprocated between the plurality of proximity sensors along a predetermined path.

13. The contactless control switch of claim 12, wherein the plurality of proximity sensors being disposed within the housing, such that the plurality of proximity sensors are positioned at predetermined angles relative to the path to minimize the stroke of the switch actuator.

14. The contactless control switch of claim 13, wherein the proximity sensors are reed switches.

15. A contactless control switch for a vehicle, the contactless switch is actuatable between a first closed circuit position and an open circuit position, the contactless switch comprising:

(a) a housing disposed within a steering column assembly;

(b) a pivot assembly disposed within the housing, the pivot assembly having a first portion supported by the housing and a mounting bracket fastened to a steering column stalk, the pivot assembly further including a second portion;

(c) a switch actuator having first and second ends, the switch actuator being supported within the housing on the pivot assembly first portion, the switch actuator being coupled to the pivot assembly second portion for producing pivoting motion of the switch actuator in response to a force applied to the switch actuator;

(d) a biasing member disposed between the switch actuator and pivot assembly second portion for biasing the switch actuator into an open circuit position; and (e) first and second proximity sensors and a first magnet, the proximity sensors being disposed within the housing and the first magnet being fastened to the switch actuator second end, the first magnet being selectively displaced into and out of close proximity with one of the proximity sensors when the force is applied to the switch actuator, wherein the second portion comprises first and second pivot axes, the switch actuator and second portion pivot about the first pivot axis to selectively displace the first magnet into close proximity with a predetermined number of the proximity sensors in response to the force, the switch actuator and second portion pivot about the second pivot axis to selectively displace the first magnet into close proximity with a different predetermined number of the proximity sensors.

16. The contactless control switch of claim 14, wherein the switch actuator pivots about the first and second pivot axes along a stroke path, such that the first magnet is selectively reciprocated between the plurality of proximity sensors along a substantially linear path.

17. The contactless control switch of claim 16, wherein the plurality of proximity sensors being disposed within the housing, such that the plurality of proximity sensors are positioned at predetermined angles relative to the linear path to minimize the stroke path of the switch actuator.

18. The contactless control switch of claim 17, wherein the proximity sensors are reed switches.

* * * * *

UNITED STATES PATENT AND TRADEMARK OFFICE
CERTIFICATE OF CORRECTION

PATENT NO.   : 6,175,290 B1
DATED        : January 16, 2001
INVENTOR(S)  : A.K. Forsythe et al.

It is certified that error appears in the above-identified patent and that said Letters Patent is hereby corrected as shown below:

Column 8,
Line 54, "claim 14," should read -- claim 15, --

Signed and Sealed this

Twentieth Day of August, 2002

Attest:

JAMES E. ROGAN
Director of the United States Patent and Trademark Office

Attesting Officer